(12) United States Patent
Jugo et al.

(10) Patent No.: US 11,273,450 B2
(45) Date of Patent: Mar. 15, 2022

(54) GRANULATOR MILL

(71) Applicant: RAPID GRANULATOR AB, Bredaryd (SE)

(72) Inventors: Ernad Jugo, Hillerstorp (SE); Kurt Sjöberg, Bredaryd (SE); Jasmin Bukaric, Värnamo (SE); Henrik Karlsson, Värnamo (SE)

(73) Assignee: RAPID GRANULATOR AB, Bredaryd (SE)

(*) Notice: Subject to any disclaimer, the term of this patent is extended or adjusted under 35 U.S.C. 154(b) by 107 days.

(21) Appl. No.: 16/609,760

(22) PCT Filed: Mar. 26, 2018

(86) PCT No.: PCT/SE2018/050322
§ 371 (c)(1),
(2) Date: Oct. 31, 2019

(87) PCT Pub. No.: WO2018/203789
PCT Pub. Date: Nov. 8, 2018

(65) Prior Publication Data
US 2020/0055056 A1    Feb. 20, 2020

(30) Foreign Application Priority Data
May 4, 2017   (SE) .................... 1750543-9

(51) Int. Cl.
*B02C 18/22*   (2006.01)
*B02C 18/14*   (2006.01)
(Continued)

(52) U.S. Cl.
CPC ............ *B02C 18/22* (2013.01); *B02C 18/142* (2013.01); *B02C 18/148* (2013.01);
(Continued)

(58) Field of Classification Search
CPC ...... B02C 2018/188; B02C 2018/0069; B02C 23/10
See application file for complete search history.

(56) References Cited

U.S. PATENT DOCUMENTS 4,114,817 A * 9/1978 Harris ..................... B02C 13/13
241/191
4,162,767 A * 7/1979 Hahn .................... B02C 13/286
222/198

(Continued)

FOREIGN PATENT DOCUMENTS

JP    H09150071 A    6/1997
JP    2002233780 A    8/2002

(Continued)

OTHER PUBLICATIONS

International Search Report and Written Opinion of the International Search Authority issued in PCT/SE2018/050322, dated May 2, 2018; ISA/SE.

*Primary Examiner* — Faye Francis
(74) *Attorney, Agent, or Firm* — Harness, Dickey & Pierce, P.L.C.

(57) ABSTRACT

Granulator mill granule chamber including at least one non-rotatable blade, rotatable rotor arranged inside the granule chamber, the rotor a number of blades which are arranged for cooperation with the non-rotatable blade, a infeed hopper for feeding waste into the granule chamber, a grid arranged in the granule chamber, where through granulated waste is allowed to pass to an outfeed hopper. A scraping device is provided in a space located axially in between a housing and the rotatable rotor and the scraping device is attached to the housing.

11 Claims, 7 Drawing Sheets

(51) Int. Cl.
  *B02C 23/10* (2006.01)
  *B02C 18/16* (2006.01)
  *B02C 18/18* (2006.01)
(52) U.S. Cl.
  CPC .......... *B02C 18/2291* (2013.01); *B02C 23/10* (2013.01); *B02C 2018/164* (2013.01); *B02C 2018/188* (2013.01)

(56) References Cited

U.S. PATENT DOCUMENTS

| | | | | |
|---|---|---|---|---|
| 4,219,291 | A * | 8/1980 | Hoeh | B02C 18/182 |
| | | | | 407/31 |
| 4,343,438 | A * | 8/1982 | Slikas | B02C 13/28 |
| | | | | 241/196 |
| 4,593,862 | A * | 6/1986 | Schaefer | B02C 13/282 |
| | | | | 241/88 |
| 4,752,036 | A * | 6/1988 | McCully | B02C 13/13 |
| | | | | 241/226 |
| 5,297,741 | A * | 3/1994 | Zurn | B02C 18/148 |
| | | | | 241/19 |
| 5,628,467 | A * | 5/1997 | Graveman | B02C 13/04 |
| | | | | 241/194 |
| 5,954,280 | A * | 9/1999 | Kroger | B02C 18/0007 |
| | | | | 241/166 |
| 6,616,077 | B2 * | 9/2003 | Koenig | B02C 18/142 |
| | | | | 241/230 |
| 7,007,878 | B2 * | 3/2006 | Strong | B02C 18/142 |
| | | | | 241/236 |
| 7,222,805 | B1 * | 5/2007 | Williams, Jr. | B02C 13/284 |
| | | | | 241/32 |
| 7,258,293 | B2 * | 8/2007 | Tanaka | B02C 18/225 |
| | | | | 241/186.35 |
| 7,980,502 | B2 * | 7/2011 | Doppstadt | B02C 18/18 |
| | | | | 241/294 |
| 9,573,137 | B2 * | 2/2017 | Van der Galien | B02C 23/16 |
| 2003/0075628 | A1 * | 4/2003 | Pretzier | B02C 18/16 |
| | | | | 241/243 |
| 2005/0040263 | A1 * | 2/2005 | Parke | B02C 18/142 |
| | | | | 241/30 |
| 2006/0079101 | A1 * | 4/2006 | Diaz | B02C 18/24 |
| | | | | 439/21 |
| 2007/0241216 | A1 * | 10/2007 | Wada | B02C 18/142 |
| | | | | 241/36 |
| 2012/0104133 | A1 * | 5/2012 | Pallmann | B02C 23/10 |
| | | | | 241/278.1 |
| 2013/0175379 | A1 | 7/2013 | Vantrease | |
| 2014/0103152 | A1 * | 4/2014 | Van der Galien | B02C 23/16 |
| | | | | 241/30 |
| 2015/0115077 | A1 * | 4/2015 | Takeda | B02C 18/0007 |
| | | | | 241/36 |
| 2016/0136651 | A1 * | 5/2016 | Serenkin | B02C 18/16 |
| | | | | 241/30 |
| 2016/0367998 | A1 * | 12/2016 | Takeda | B23H 9/00 |
| 2021/0069722 | A1 * | 3/2021 | Kjaersgaard | B02C 18/18 |

FOREIGN PATENT DOCUMENTS

| | | |
|---|---|---|
| JP | 2010042384 A | 2/2010 |
| JP | 2011104537 A | 6/2011 |

* cited by examiner

GRANULATOR MILL

CROSS REFERENCE TO RELATED APPLICATIONS

This application is a U.S. National Phase under 35 U.S.C. 371 of International Application No. PCT/SE2018/050322, filed 26 Mar. 2018, and published as WO 2018/203789A1 on Nov. 8, 2018. This application is based on and claims priority to Swedish Application No. 1750543-9 filed May 4, 2017. The entire disclosures of the above applications are incorporated herein by reference.

TECHNICAL FIELD

The present invention relates generally to a granulator mill according to claim 1.

BACKGROUND ART

In prior art it is known granulator mills used within the plastics industry for recycling or reuse of plastic waste. During the granulation of the plastic waste, the granulator mill granulate the plastic waste into plastic chips. The smaller chips, the greater probability that the chips wedge into narrow spaces within the granulator mill.

One area, within which granulated plastic chips tend to wedge is in a space extending in an axial direction between a rotatable rotor and the static housing of the granulator mill. In the beginning of the granulator process the plastic waste is too large to get stuck in the axial space when tumbled around inside the granule chamber by means of the rotor. When the granulated waste has been granulated for a while and starts to take the size of the mesh within the grid then there is an increased risk that the chips get stuck in between the static housing and the rotatable rotor. When one or more of chips has got stuck, the harder for the rotor to rotate and the larger friction force is exerted between the rotor and the static housing and this leads to heated plastic chips which may get sticky and thus get stuck between the rotatable rotor and the static housing and deteriorate the function of the granulator mill. Thus, the wedged plastic chips may also restrain the rotary speed of the rotor. Further, the friction force may result in overheating of the granulator mill.

Another drawback when one or more plastic chips wedge between the rotatable rotor and the static housing, is that when the wedged plastic chip is heated, the solid plastic of the chip may melt and transform into disintegrated plastic threads during the rotation of the rotor. These disintegrated plastic threads are equipped with other material properties than the correct granulated chips, and are of this reason not wanted in the final plastic granulate.

SUMMARY OF INVENTION

An object of the present invention is to create a granulator mill which eliminate that granulated plastic chips get stuck and restrain the rotary speed of the rotor. Another object of the present invention is to prevent the plastic chips to transform into disintegrated plastic threads during the granulation process.

The object is met by the granulator mill. The granulator mill comprises a granule chamber comprising at least one non-rotatable blade and a rotatable rotor arranged inside the granule chamber. Further the rotor of the granulator mill comprises a number of blades which are arranged for cooperation with the at least one non-rotatable blade, and an infeed hopper for feeding waste into the granule chamber. A grid is arranged in the granule chamber, where through granulated waste is allowed to pass to an outfeed hopper. A scraping device is provided in a space located axially in between the housing and the rotatable rotor and the scraping device is attached to the housing.

The scraping device is provided to extend radially towards an outer circumference periphery of the granule chamber, this to guide the granulated waste away from the axial space between the housing and the rotatable rotor. The scraping device is provided on the housing, facing the side of the rotor which is subjected to downward rotation and/or upward rotation. Preferably, the rotor is arranged to rotate clockwise and the scraper is provided on the side of the rotor which is subjected to downward rotation of the rotor.

The scraping device extends radially towards the outer circumference periphery in a tangential direction with starting point in an imaginary vertical center line of the rotatable rotor in the granule chamber. The scraping device has an axial extension which is equal to or less than the axial space between the housing and the rotatable rotor, this to allow the rotor to rotate without restricting the rotation of the rotor. During the granulation process the rotatable rotor makes the plastic granulate to circulate within the granule chamber. In the point where the imaginary vertical centerline meets the outer periphery of the rotor, the circulated plastic granules change their direction of motion, from upwards to downwards due to the force of gravity and the risk that the plastic chips tend to fasten in the axial space is greater. Thus, the scraping device prevents the plastic chips from entering the axial space between the housing and the rotatable rotor.

The scraping device is provided on a wall of the granule chamber in such a way that that the scraping device extend at least to the periphery of the rotating rotor, this to guide the granulated plastic chips to a region of the granulation chamber where wedging of the plastic chips are of less importance. The scraping device is an elongated metal plate.

The scraping device can be provided on a wear plate which is attached to the walls of the granule chamber. The walls of the granule chamber can be provided with projecting flanges, which project from the walls and encircle the rotating rotor. The projecting flanges are arranged to extend into a corresponding groove arranged on the rotating rotor, this to establish an enclosure around the rotating rotor.

BRIEF DESCRIPTION OF DRAWINGS

The invention is now described, by way of example, with reference to the accompanying drawings, in which.

DESCRIPTION OF EMBODIMENTS

In the description below, various directions will be given with reference to a granulator mill arranged in a position ready for use. In the description below, terms as axial and radial are used and these are seen in view of the orientation of an axle of a rotor. The axial direction is to be interpreted as the direction along the extension of the axis of rotation of the rotor, and radial direction is to be interpreted as the direction across the rotor axle. Further, in the description directions such as up and down are also used and these relate to when the granulator mill is in a state ready for use.

In the following, a detailed description of a granulator mill according to the invention is disclosed in detail. In FIG. 1-5B a granulator mill 1 is disclosed. The granulator mill 1 comprises a granulator mill housing 2 which accommodates a granule chamber 3. The granulator mill housing 2 is provided with at least one blade 4 which is fixedly arranged on the housing 2.

On an upper side of the granulator mill housing 2, an infeed hopper or hopper section 5 is provided. By means of the infeed hopper or hopper section 5, plastics that are to be recycled or reused are fed into the granule chamber 3.

The granule chamber 3 is provided with two internal walls 6, 7 which are parallel to each other, between which a rotor 8 is rotatably journaled. Driving of the rotor 8 is put into effect by means of a motor 9.

Figure 1:
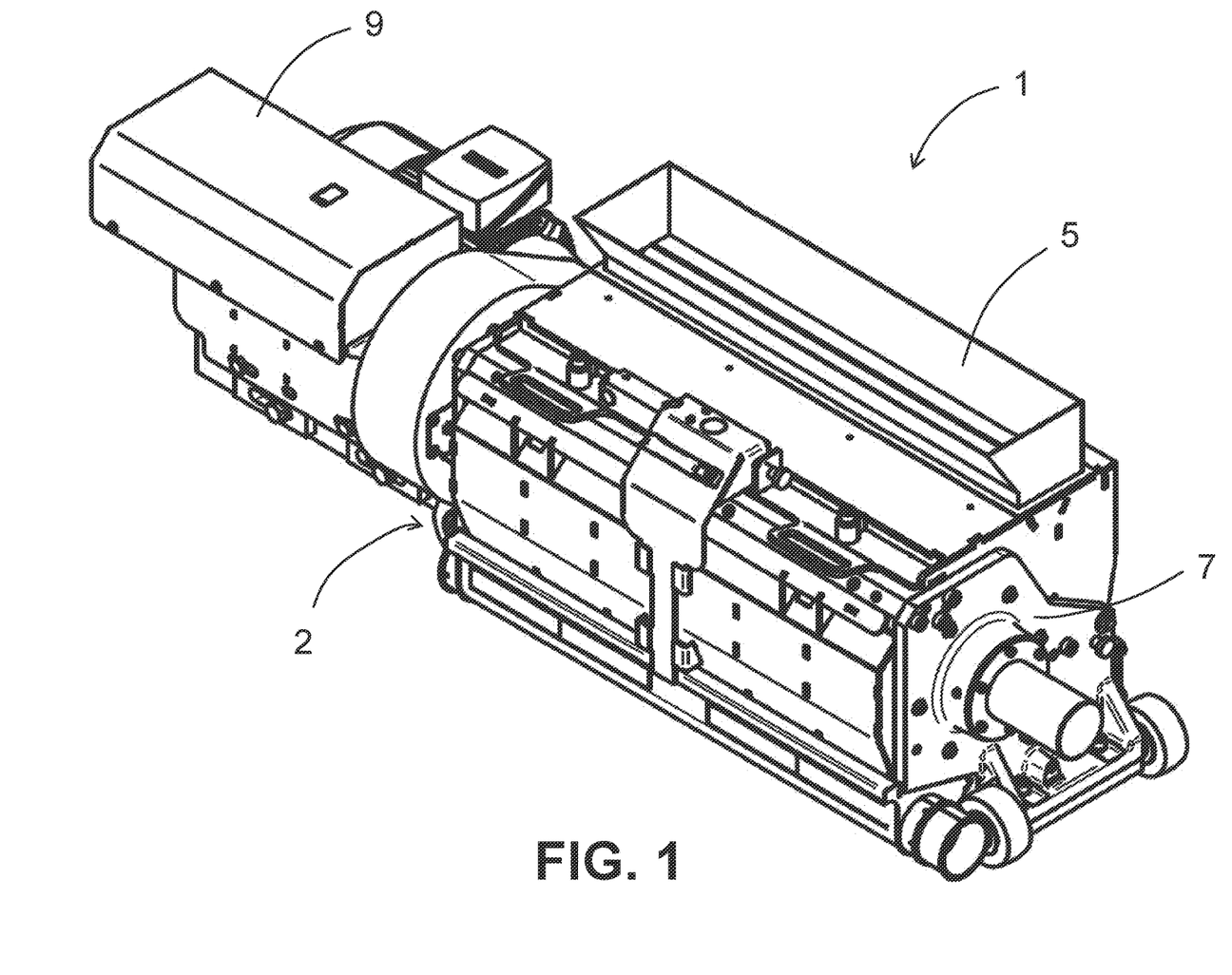
FIG. 1 is a perspective view of a granulator mill seen from above.
Figure 2A:
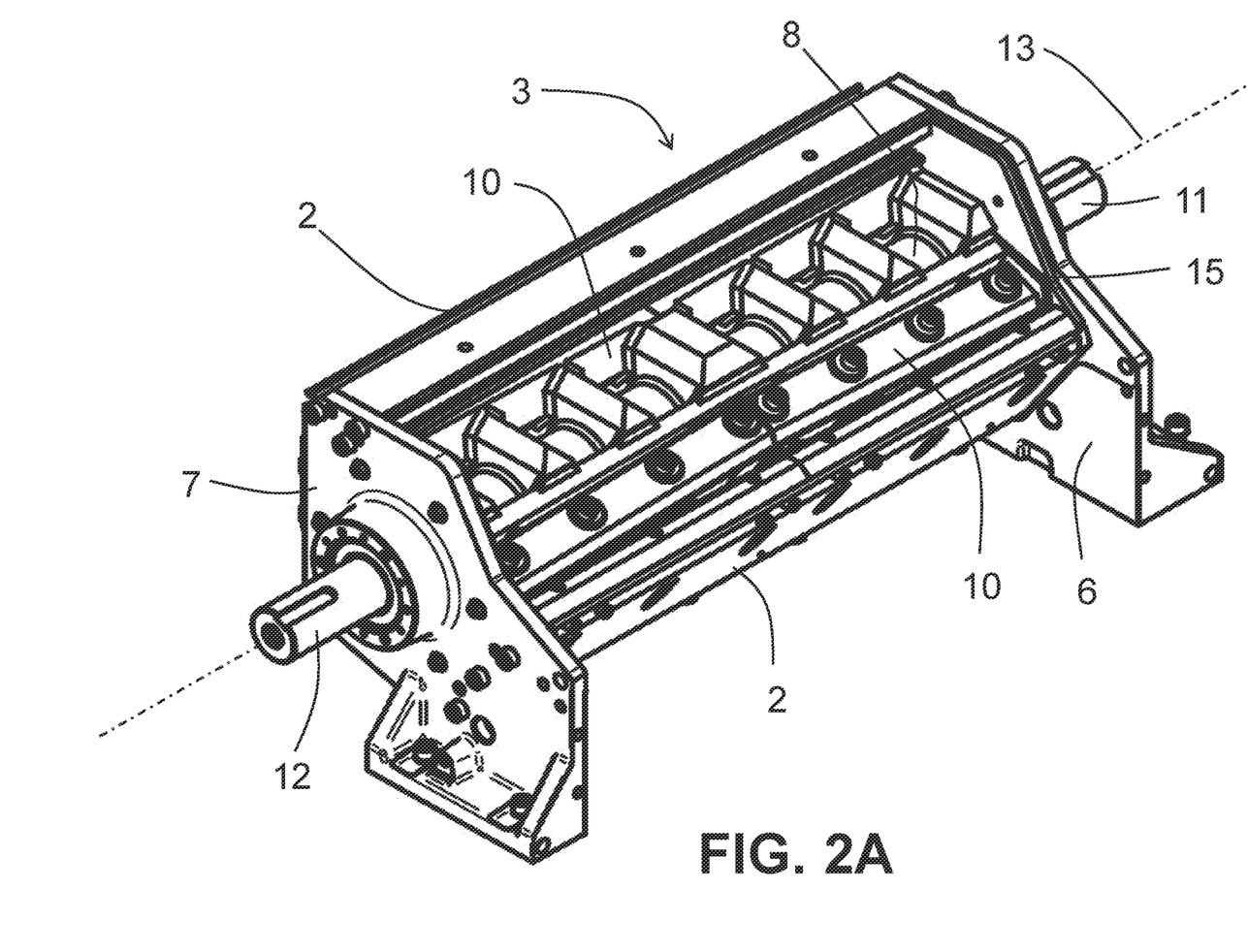
FIG. 2A is a detailed view of a rotor of the granulator mill.
Figure 2B:
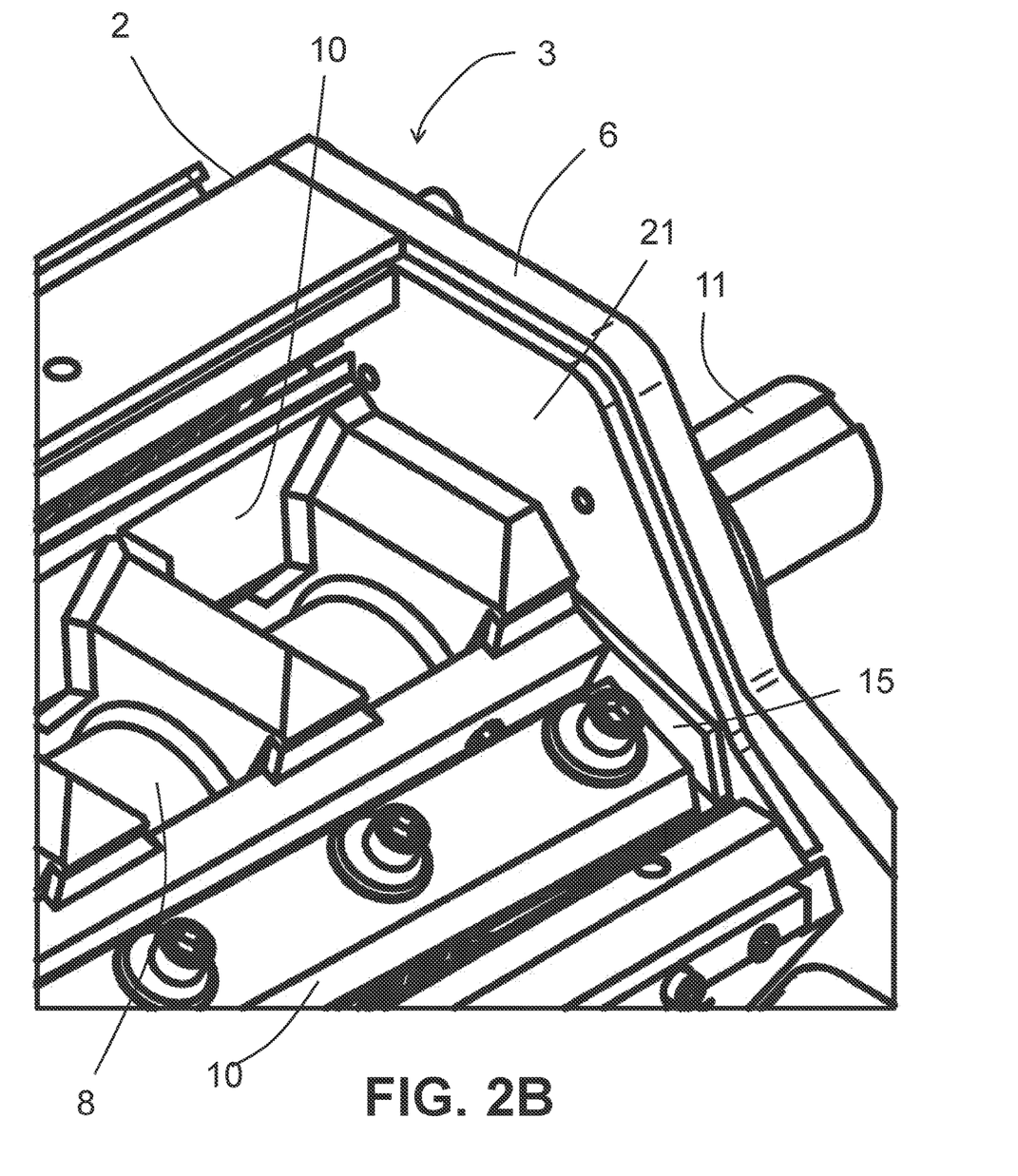
FIG. 2B is an enlarged detailed view according to FIG. 2A.
Figure 3:
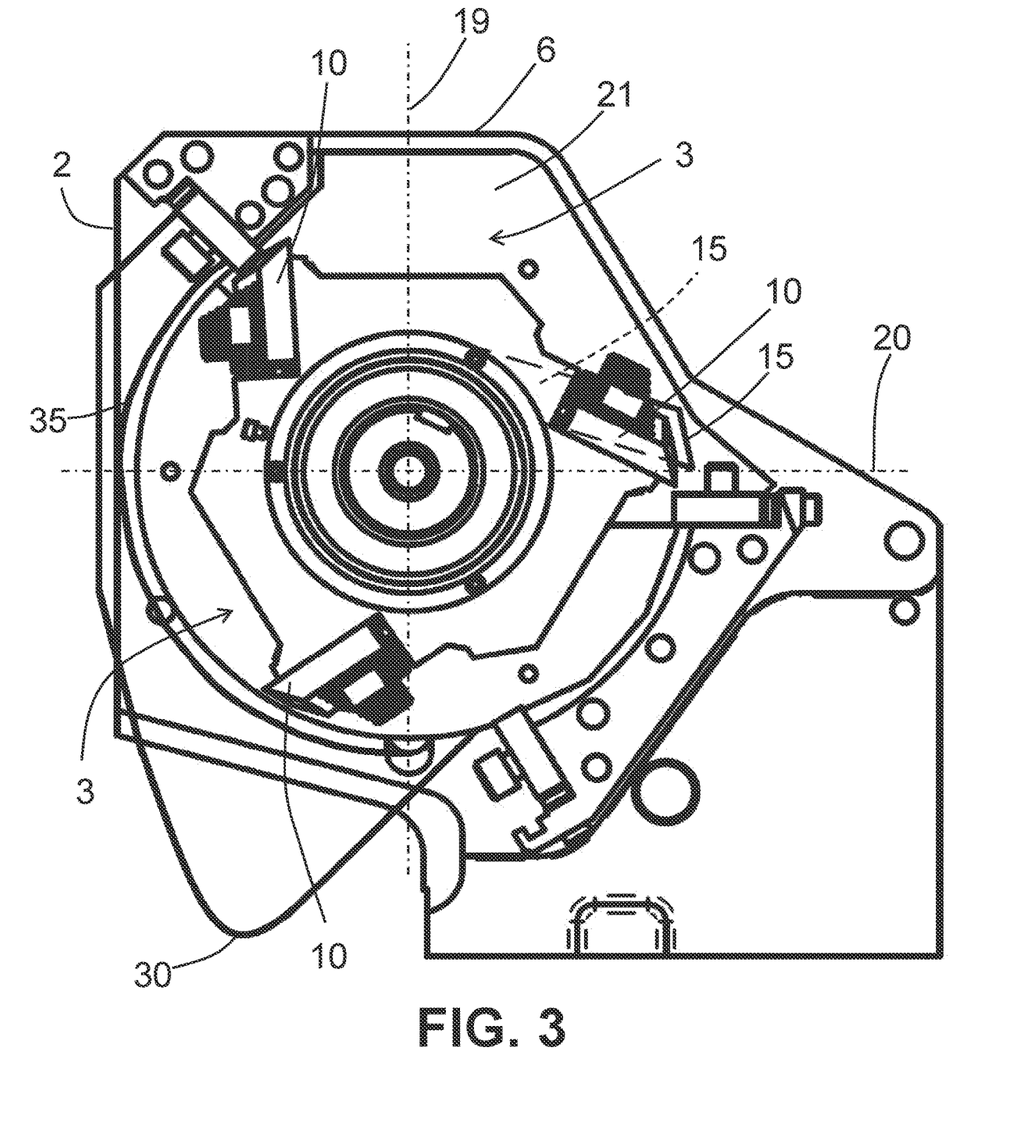
FIG. 3 is a vertical cross section through the rotor perpendicular to the rotational axis.

The rotatable rotor 8 is provided with at least one or preferably a number of blades 10 at its periphery which are provided to cooperate with the fixed blade 4 provided on the housing 2 during a granulation process. The fixed blade 4 may be one or more. In the example of FIG. 3 there are three fixed blades 4 spaced apart around the circumference of the rotatable rotor 8. The fixed blades 4 are disposed closely adjacent to and co-operate with the rotatable blades 10 around the peripheral surface of the rotor 8.

The blades 4, 10 on either or both of the rotor 8 and the housing 2 are preferably detachable so that the blades 4, 10 may be exchanged when necessary.

Within the interior granule chamber 3 a grid (not shown) is provided. Preferably, the grid is provided within the lower part of the granulation chamber 3 which communicate with an outfeed hopper 30. Further, the grid is provided with a mesh, which determine the size of the plastic chips that is allowed to pass the grid and further into the outfeed hopper 30. The waste plastics is granulated by means of the blades 4, 10 of the rotor 8 and the housing 2 when they are ground towards each other.

Internally in granulate chamber 3, the granulation of the plastic material takes place. When the granulation process has proceeded sufficiently, the finely-divided particles or granulate pass through the grid, which may have varying mesh size. This grid surrounds the rotor 8 along a part of its periphery. On the underside or outside of the grid, the outfeed hopper 30 is situated, in which the granulated material is collected and from which the granulate material is conveyed off via an outlet.

Within the granulate chamber there are numeral regions where plastic chips may get jammed. One region which is especially subjected to jamming is a space 14 situated in between the rotatable rotor 8 and the static housing 2 within the granule chamber 3. Each end of the rotor 8, is provided with a projecting shaft 11, 12 which is provided in the internal walls 6, 7 of the granulate chamber 3. The projecting shafts 11, 12 are journaled in a bearing 24 arranged in the internal walls 6, 7. The bearing 24 can for example be ball bearings. Further, the projecting shafts 11, 12 of the rotor 8 are arranged in the prolongation of the axis of rotation 13. The projecting shafts constitute a rotational axle that is driven to rotate by the motor 9 in order to rotate the rotor 8.

Figure 4:
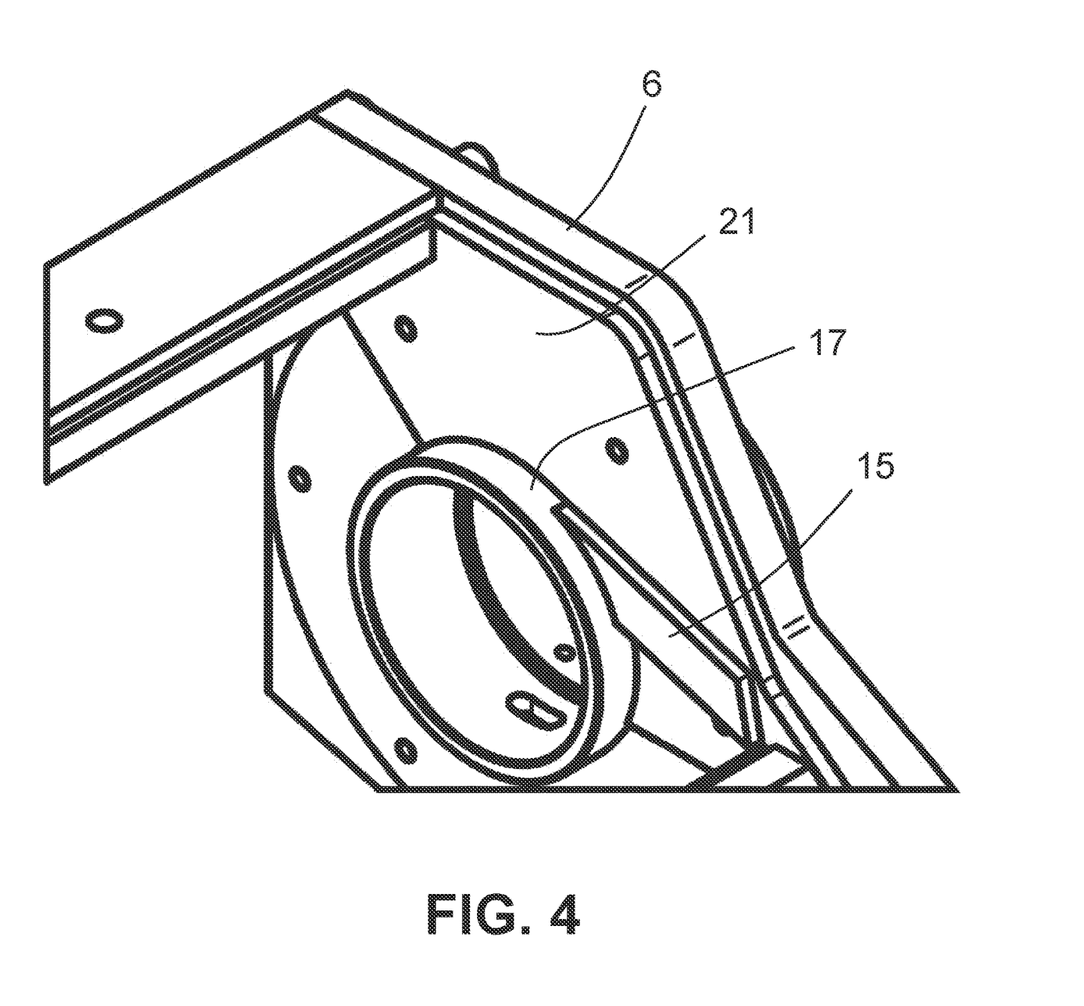
FIG. 4 is a detailed view of the granulator mill with a rotor excluded.

To minimize and prevent plastic chips from entering this space 14 between the rotatable rotor 8 and the static housing 2, a projecting part 15 is provided within the space 14 extending in the axial direction between the rotor 8 and the internal walls 6, 7 of the granule chamber 3. The projecting part 15 is attached to a wear plate 21 which is attached to each of the walls 6, 7 of the granule chamber 3. The projecting part 15 extend radially toward an outer circumference periphery of the granule chamber 3, as shown in FIG. 4. The wear plate 21, which is optional, has the purpose to increase the wear resistance of the walls 6, 7 in the area were the scraping device 15 is provided. In another embodiment, the projecting part may be attached directly to one or more of the internal walls 6, 7. The projecting part 15 is a scraping device which has as purpose to guide away the plastic chips which end up in a space 14 between the rotor 8 and the walls 6, 7 of the granule chamber 3, and preventing them from entering this area and getting stuck. The chips that are guided away during the granulating process are guided from this area, and back to the granulate chamber to get granulated again.

The scraping device 15 is preferably elongated and provided to extend radially towards an outer circumference periphery of the granule chamber 3. Thus the scraping device 15 has the function of a guide which direct the plastic chips from this area. The scraping device 15 extend from a radially inner part of the internal walls 6, 7 of the granule chamber 3 to a radially outside part corresponding to outside the circumference of the cross section of the rotor 8, this to be able to lead off chips from staying in the space 14. Irrespective of the rotor 8 is arranged to rotate clockwise or counterclockwise, the scraping device 15 can be provided on the side of the rotor 8 which is subjected to downward rotation of the rotor 8 and/or provided on the side of the rotor 8 which is subjected to upward rotation.

The scraping device 15 is mounted on the internal wall 6, 7 of the granule chamber 3 in such a way that that the scraping device 15 extend at least to the periphery of the rotating rotor 8 and preferably extend past the periphery of the rotating rotor 8.

The scraping device 15 is provided on the internal walls 6, 7 of the granule chamber 3, facing the side of the rotor 8, and extend in a tangential direction from the periphery of the rotating rotor 8 towards the fixed blade 4 on the granulator mill housing 2. The shaft of the rotor 8 comprises an axis of rotation 13 and from this axis of rotation 13 an imaginary vertical center line 19 and an imaginary horizontal center line 20 have their origin. In one embodiment the scraping device 15 is provided on the wear plate 21 which is attached to the walls 6, 7 of the granule chamber 3. The scraping device 15 is arranged to extend from a starting point on or in the vicinity of the imaginary vertical center line 19 towards an end point at or beyond the periphery of the rotating rotor 8. Around the part of the circumference where the rotor 8 is subjected to downward rotation the scraping device 15 may have the starting point on or in the vicinity of the rotor 8 and the imaginary vertical center line 19 which is provided in an upper section of the circumference of the rotor 8. The upper section is preferably above the imaginary horizontal center line 20. Thus, if the rotor rotates clockwise the scraping device 15 is provided in an upper right quadrant of the circumference of the rotor.

Around the part of the circumference where the rotor 8 is subjected to upward rotation, the scraping device 15 has a starting point on or in the vicinity of the rotor 8 and the imaginary vertical center line 19 which is provided in a lower section of the circumference of the rotor. The lower section is preferably below the imaginary horizontal center line 20. Thus, if the rotor rotates clockwise the scraping device 15 is provided in a lower left quadrant of the circumference of the rotor.

The scraping device 15 has an axial extension which is equal to or less than the axial space 14 between the housing 2 and the rotatable rotor 8. The scraping device 15 can be a part integrated into the internal walls 6, 7 of the granule chamber 3 or be a plate which is retrofitted. The scraping device 15 is preferably a plate which is an elongated metal plate.

Figure 5A:
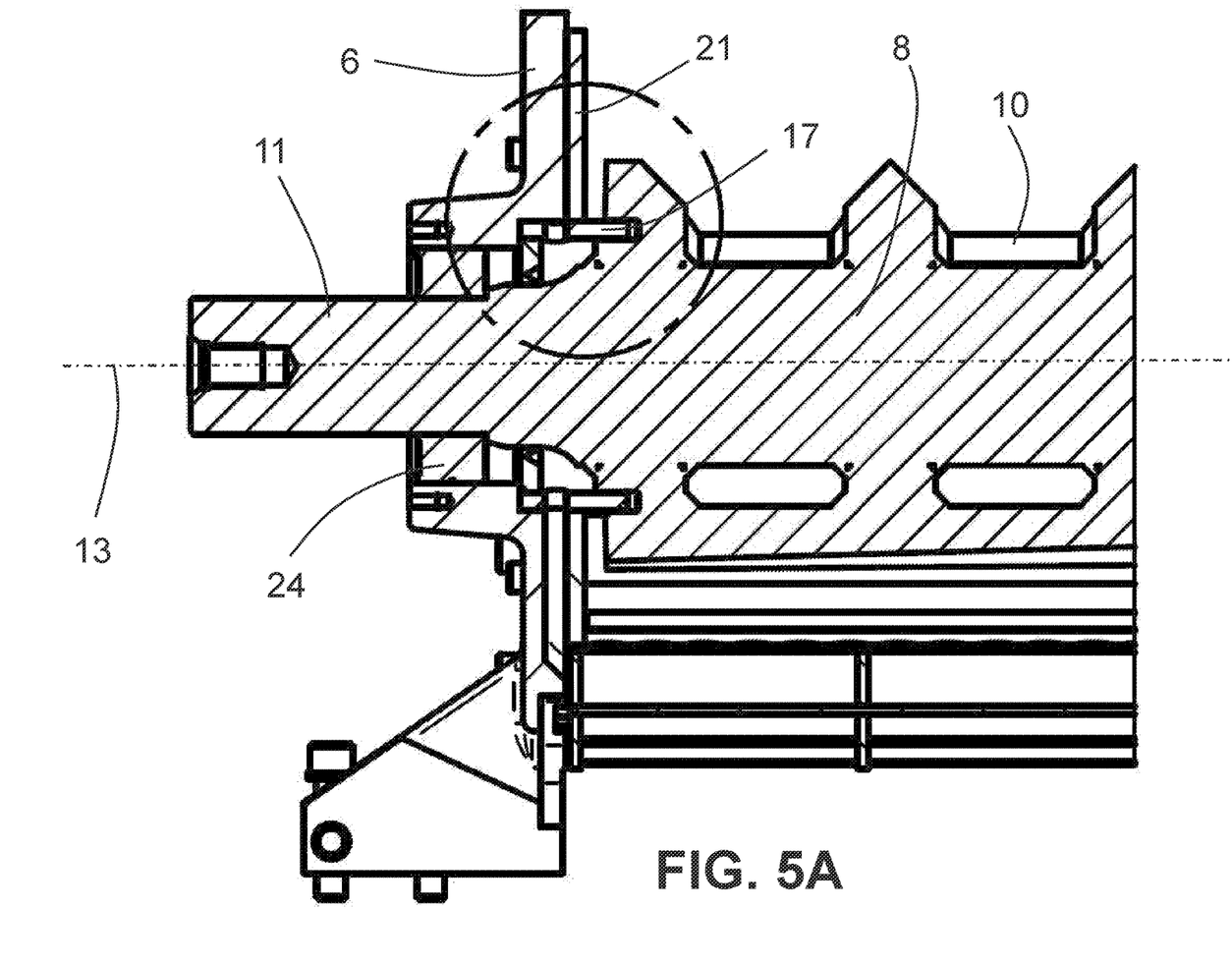
FIG. 5A is a substantially vertical cross-section through the rotor and a scraping device along the rotational axis.
Figure 5B:
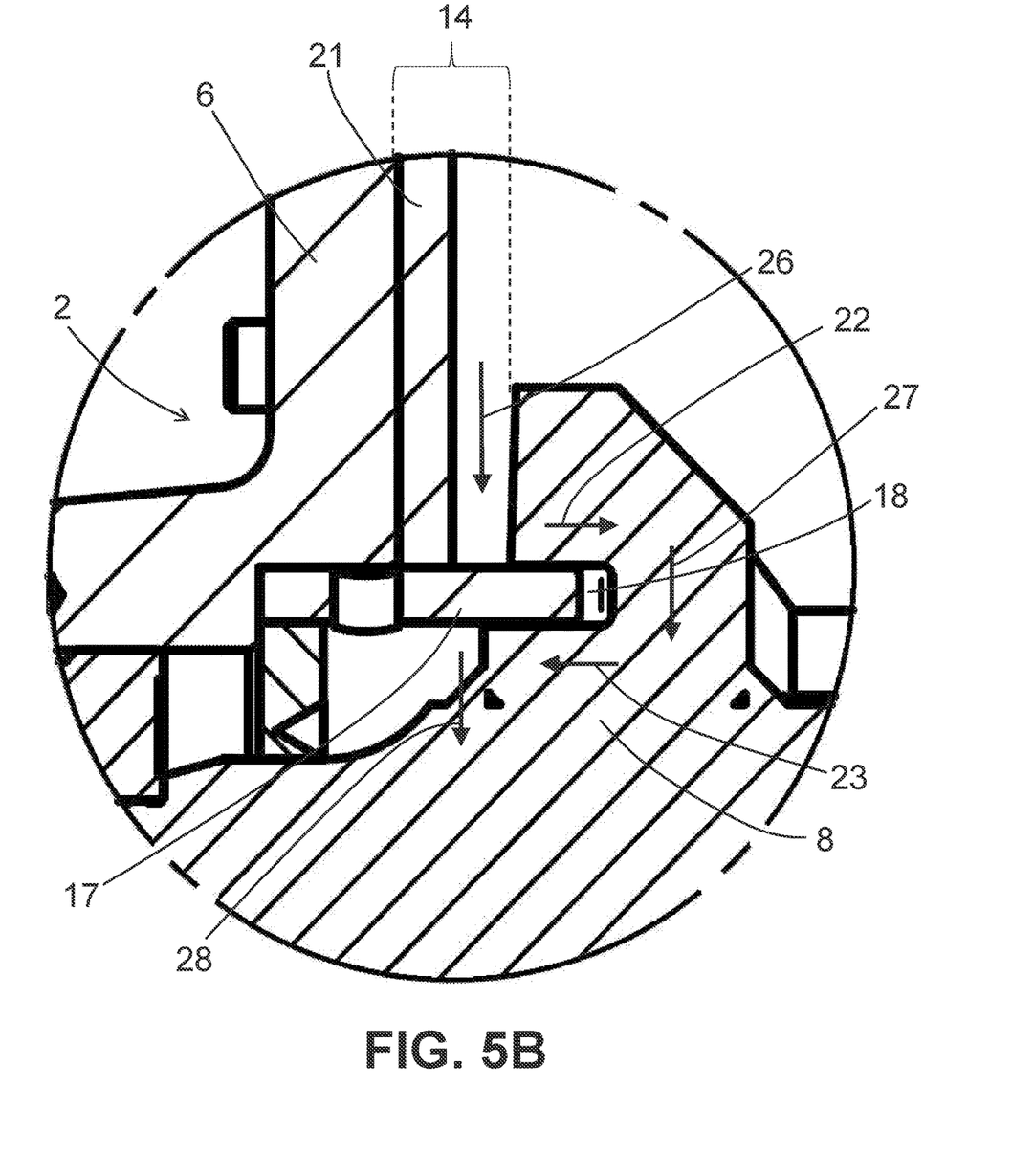
FIG. 5B is an enlarged detailed view according to FIG. 5A.

In FIG. 4 and FIG. 5A-5B a part of the granule chamber 3 is shown. One of the two internal walls 6, 7 of the granule chamber 3 is shown, which internal walls 6, 7 are parallel to each other. Further, the rotor 8 is rotatably journaled between these parallel walls 6, 7. In an alternative embodiment, the internal walls 6, 7 can be provided with projecting flanges 17 which project from the internal walls 6, 7 towards the granule chamber 3. The projecting flanges 17 are ring shaped and encircle the rotating rotor 8 360 degrees around its circumference.

Further, the projecting flanges 17 are arranged to extend into a corresponding groove 18 arranged on the rotating rotor 8, this to establish an enclosure around the rotating rotor 8 to obstruct the plastic chips from entering and jamming the rotating shaft of the rotor 8. The projecting flanges 17 are fixedly attached to the housing 2, and each of the projecting flanges 17 are provided to extend into each one of the grooves 18. The grooves 18 are provided on the rotor 8 which is arranged to rotate around its axis of rotation 13. In an assembled state, each of the projecting flanges 17 are provided with a small gap to each of the grooves 18, this to allow the rotor 8 to rotate while the housing is stationary. The projecting flanges 17 and the grooves 18 constitute together a labyrinth solution which obstruct the plastic chips to wedge in between the granulator mill housing 2 and the rotating rotor 8. The labyrinth solution is shown in FIGS. 5A and 5B comprises a small gap in between the rotor 8 and the housing 2 and its projecting parts 11, 12. The small gap extend at least in first, second and third radial directions 26, 27, 28 and at least first and second axial directions 22, 23. In the case a plastic chip is about to pass through the labyrinth solution it has to change its direction of motion at least four times. Thus, to be able to pass the labyrinth solution the plastic chip first needs to enter between the scraping device 15 and the rotor 8 in an first radial direction 26, and then turn 90 degrees into the groove 18 of the rotor 8 to an first axial direction 22 of the rotor, then turn 90 degrees to a second radial direction 27 of the rotor 8, then turn 90 degrees to an second axial direction 23 of the rotor 8, then turn 90 degrees to a third radial direction 28 of the rotor 8.

In the case the projecting flanges 17 are used, the scraping device 15 is arranged to abut against an outer directed surface of the projecting flanges 17, either on the side of the rotor 8 which is subjected to downward rotation and/or the side of the rotor 8 which is subjected to upward rotation.

The invention claimed is:

1. A granulator mill comprising:
    a housing extending longitudinally with a cylindrical-shaped granule chamber disposed within the housing, the housing having at least one non-rotatable blade extending into the chamber, a first end wall disposed at one end of the chamber, and a second end wall disposed at another end of the chamber,
    a rotatable rotor extending longitudinally and arranged inside the granule chamber, the rotor having a first end facing the first end wall and a second end facing the second end wall, and the rotor having a number of blades which are arranged for cooperation with the at least one non-rotatable blade,
    an infeed hopper for feeding waste into the granule chamber,
    a grid arranged in the granule chamber, where through granulated waste is allowed to pass to an outfeed hopper, and
    a scraping device disposed on at least one of the end walls and provided in a space located axially in between the at least one of the end walls and the corresponding end of the rotatable rotor to remove or prevent accumulation of the granulated waste between the at least one end walls and the corresponding end of the rotatable rotor.

2. The granulator mill according to claim 1, wherein the scraping device is disposed near a rotational axis of the rotor and the scraping device extends radially along the at least one end wall towards an outer circumference periphery of the granule chamber.

3. The granulator mill according to claim 1, wherein the scraping device is provided on the at least one end wall, facing the corresponding end of the rotor and on a side of the rotor which is subjected to downward rotation or upward rotation or both downward and upward rotation.

4. The granulator mill according to claim 1, wherein the rotatable rotor is arranged to rotate clockwise and the scraping device is provided on the at least one end wall, facing the corresponding end of the rotor and on a side of the rotor which is subjected to downward rotation of the rotor.

5. The granulator mill according to claim 1, wherein the scraping device extends from a starting point on an imaginary vertical center line on the at least one end wall, the imaginary vertical center line extending vertically from a rotational axis of the rotatable rotor in the granule chamber, and the scraping device further extending radially toward an outer circumference periphery of the granule chamber.

6. The granulator mill according to claim 1, wherein the scraping device has an axial extension which is equal to or less than the axial space between the at least one end wall and the corresponding end of the rotatable rotor.

7. The granulator mill according to claim 1, wherein the scraping device is provided on the at least one end wall at a position near a rotational axis of the rotor and extends to a position on the end wall corresponding at least to a periphery of the rotating rotor.

8. The granulator mill according to claim 1, wherein the scraping device is an elongated metal plate.

9. The granulator mill according to claim 1, wherein the scraping device is provided on a wear plate which is attached to the at least one end wall.

10. The granulator mill according to claim 7, wherein each of the first and second end walls are provided with projecting flanges which encircle a portion of the rotating rotor.

11. The granulator mill according to claim 10, wherein the projecting flanges are arranged to extend into a corresponding groove arranged on the rotating rotor, this to establish an enclosure around the portion of the rotating rotor.

* * * * *